(12) United States Patent
Takahashi (10) Patent No.: US 7,412,083 B2
(45) Date of Patent: Aug. 12, 2008

(54) FINGERPRINT READING METHOD AND FINGERPRINT READING SYSTEM

(75) Inventor: Nobuo Takahashi, Kanagawa (JP)

(73) Assignee: NEC Infrontia Corporation, Kanagawa (JP)

(*) Notice: Subject to any disclaimer, the term of this patent is extended or adjusted under 35 U.S.C. 154(b) by 506 days.

(21) Appl. No.: 11/102,827

(22) Filed: Apr. 11, 2005

(65) Prior Publication Data

US 2005/0226479 A1 Oct. 13, 2005

(30) Foreign Application Priority Data

Apr. 13, 2004 (JP) ............... 2004-118018

(51) Int. Cl.
*G06K 9/00* (2006.01)
(52) U.S. Cl. ............... 382/124; 382/125; 340/5.53; 713/186
(58) Field of Classification Search ............... 382/124
See application file for complete search history.

(56) References Cited

U.S. PATENT DOCUMENTS

| | | | | |
|---|---|---|---|---|
| 5,799,098 | A * | 8/1998 | Ort et al. | 382/125 |
| 6,289,114 | B1 * | 9/2001 | Mainguet | 382/124 |
| 6,459,804 | B2 * | 10/2002 | Mainguet | 382/124 |
| 7,197,168 | B2 * | 3/2007 | Russo | 382/125 |
| 7,200,250 | B2 * | 4/2007 | Chou | 382/124 |
| 2001/0026636 | A1 * | 10/2001 | Mainguet | 382/124 |
| 2002/0164056 | A1 * | 11/2002 | Funada | 382/124 |
| 2002/0181749 | A1 * | 12/2002 | Matsumoto et al. | 382/125 |
| 2003/0002717 | A1 * | 1/2003 | Hamid | 382/124 |
| 2003/0002718 | A1 * | 1/2003 | Hamid | 382/124 |
| 2003/0035570 | A1 * | 2/2003 | Benkley, III | 382/124 |
| 2003/0123714 | A1 * | 7/2003 | O'Gorman et al. | 382/124 |

FOREIGN PATENT DOCUMENTS

| | | | |
|---|---|---|---|
| JP | 07-271977 | A | 10/1995 |
| JP | 10-091769 | A | 4/1998 |
| JP | 11-253428 | A | 9/1999 |
| JP | 2002-366950 | A | 12/2002 |
| JP | 2003-03660 | A | 1/2003 |
| JP | 2003-051013 | A | 2/2003 |
| JP | 2003-208620 | A | 7/2003 |

(Continued)

*Primary Examiner*—Samir A. Ahmed
*Assistant Examiner*—Aklilu k Woldemariam
(74) *Attorney, Agent, or Firm*—Sughrue Mion, PLLC (57) ABSTRACT

A memory region for fingerprint images acquired from a sweep type fingerprint sensor is saved. A fingerprint reading system including a sweep type fingerprint sensor and a memory to store a partial fingerprint image read by the sensor includes an image acquisition unit which successively acquires partial fingerprint images by using the sweep type fingerprint sensor, a reconstruction unit which overlaps an acquired partial fingerprint image and an already acquired partial fingerprint image, stores a resultant image in the memory, and monitors whether a definite region has reached a predetermined size, a feature extraction unit which generates feature information of the fingerprint by using an image in the definite region when the definite region reached at the predetermined size in the reconstruction unit, and releases a memory portion corresponding to the definite region after the generation of feature information, and a feature construction unit which successively records generated feature information in accordance with its generation order. When the memory portion of the definite region is released, the reconstruction unit conducts subsequent reconstruction processing by using the memory portion.

8 Claims, 6 Drawing Sheets

FOREIGN PATENT DOCUMENTS

| | | |
|---|---|---|
| JP | 2003-242489 A | 8/2003 |
| JP | 2003-248820 A | 9/2003 |
| JP | 2003-248828 A | 9/2003 |
| JP | 2003-527650 A | 9/2003 |
| JP | 2003-331269 A | 11/2003 |
| WO | WO 02/09034 A1 | 1/2002 |

\* cited by examiner

FIG.4

- 30: MEMORY DEVICE
- 310: PRIMARY REGION
- 311: RECONSTRUCTION REGION
- 61: PARTIAL FEATURE EXTRACTION REGION
- 312: FINGERPRINT FEATURE INFORMATION STORAGE REGION

FIG.5

- 21: FINGER
- 21A: FINGERPRINT

FINGERPRINT READING METHOD AND FINGERPRINT READING SYSTEM

BACKGROUND OF THE INVENTION

1. Field of the Invention

The present invention relates to a fingerprint reading method of acquiring a fingerprint image of a finger and generating feature information of the fingerprint based on the image. In particular, the present invention relates to a method of using the so-called sweep type fingerprint sensor to successively acquire a series of partial fingerprint images which represent a fingerprint, from a finger which conducts slide operation.

2. Description of the Related Art

Conventionally, a kind of information processing apparatuses such as personal computers or portable telephones equipped with a fingerprint authentication function of ensuring that a user is an owner of the information processing apparatus or a previously authorized user are spread. Especially in a small-sized terminal apparatus represented by a personal digital assistant among the apparatuses of the kind, it is demanded to make the space occupied by a sensor which reads the fingerprint small as far as possible. As a conventional system meeting this demand, a fingerprint collation system using a sweep type fingerprint sensor which successively reads fingerprint images from a finger which slides on a rectangular perception plane having a lateral width equivalent to the width of the finger is known.

Since the sweep type fingerprint sensor in the above-described system continuously reads partial fingerprint images corresponding to a part of a fingerprint, a technical contrivance is needed to obtain information concerning the whole fingerprint from the read partial fingerprint images. As the technique, there is, for example, a technique of reconstructing the whole fingerprint image by successively superposing read partial fingerprint images, and using the whole fingerprint image in registration and collation of personal information, as in techniques in Japanese Patent Application Laid-Open Publication Nos. 10-091769 and 2003-331269 described later. Furthermore, there is a technique of conducting collation processing by comparing continuously obtained partial fingerprint images with a previously registered image without reconstructing the whole fingerprint image as, for example, in a technique in Japanese Patent Application Laid-Open Publication No. 2003-051013 described later.

According to the techniques in Japanese Patent Application Laid-Open Publication Nos. 10-091769 and 2003-331269, it is possible to prevent a missing place from occurring in the whole fingerprint image by superposing the partial fingerprint images. In the above-described technique, however, all partial fingerprint images are read to reconstruct the whole fingerprint image and processing for authentication is started. Therefore, a vast memory space capable of buffering all the partial fingerprint images successively read is needed. Furthermore, there is a disadvantage that the next processing such as extraction of feature information of the fingerprint cannot be started until the whole fingerprint image is completed.

On the other hand, according to the technique disclosed in Japanese Patent Application Laid-Open Publication No. 2003-051013, reconstruction of the whole fingerprint image is unnecessary, and consequently a vast memory space is not needed and the processing time can be shortened. However, the technique lacks important information as to where in the whole fingerprint the feature information of a partial fingerprint image used at the time of collation is located. In principle, there is a problem that it is difficult to implement high-precision collation.

SUMMARY OF THE INVENTION

In order to solve the problems, the present invention has been achieved. An object of the present invention is to provide a fingerprint reading method and a fingerprint reading system capable of contracting the memory space used to buffer the partial fingerprint images and making the processes leading to the authentication processing efficient.

A fingerprint reading method according to the present invention is a fingerprint reading method used in a fingerprint reading system including a sweep type fingerprint sensor to read a series of partial fingerprint images representing a fingerprint from a finger which conducts slide operation, the fingerprint reading method including the steps of executing an image acquisition process to successively acquire partial fingerprint images by using the sweep type fingerprint sensor, a reconstruction process to make a partial fingerprint image acquired by the image acquisition process and an already acquired partial fingerprint image overlap each other in a corresponding portion, store a resultant image in a memory, and monitor to determine whether a definite region which becomes a region in which a new image change is not caused by the storage has reached a predetermined size, a feature extraction process to generate feature information of the fingerprint by using an image in the definite region when the definite region reached at the predetermined size in the reconstruction process, and to release a memory portion corresponding to the definite region after the generation of feature information, and a feature construction process to successively record feature information generated in the feature extraction process in accordance with its generation order, and executing the reconstruction process on a subsequent partial fingerprint image by using a memory portion corresponding to the definite region, when the memory portion is released in the feature extraction process.

A fingerprint reading system according to the present invention is a fingerprint reading system including a sweep type fingerprint sensor to read a series of partial fingerprint images representing a fingerprint from a finger which conducts slide operation, and a memory to store a partial fingerprint image read by the sensor, the fingerprint reading system including an image acquisition unit which successively acquires partial fingerprint images by using the sweep type fingerprint sensor, a reconstruction unit which makes a partial fingerprint image acquired by the image acquisition unit and an already acquired partial fingerprint image overlap each other in a corresponding portion, stores a resultant image in the memory, and monitors to determine whether a definite region which becomes a region in which a new image change is not caused by the storage has reached a predetermined size, a feature extraction unit which generates feature information of the fingerprint by using an image in the definite region when the definite region reached at the predetermined size in the reconstruction unit, and releases a memory portion corresponding to the definite region after the generation of feature information, and a feature construction unit which successively records feature information generated by the feature extraction unit in accordance with its generation order. When the feature extraction unit has released the memory portion corresponding to the definite region, the reconstruction unit stores a subsequent partial fingerprint image in the memory portion.

According to the present invention, feature information is generated whenever the definite region reaches the predetermined size without waiting for the reconstruction of the whole fingerprint. Therefore, the efficiency of the processes leading to the authentication process is raised, and consequently the processing time can be shortened. Furthermore, since the memory region is released when feature information of the fingerprint has been extracted, it becomes possible to save the memory space.

DESCRIPTION OF THE PREFERRED EMBODIMENTS

Figure 1:
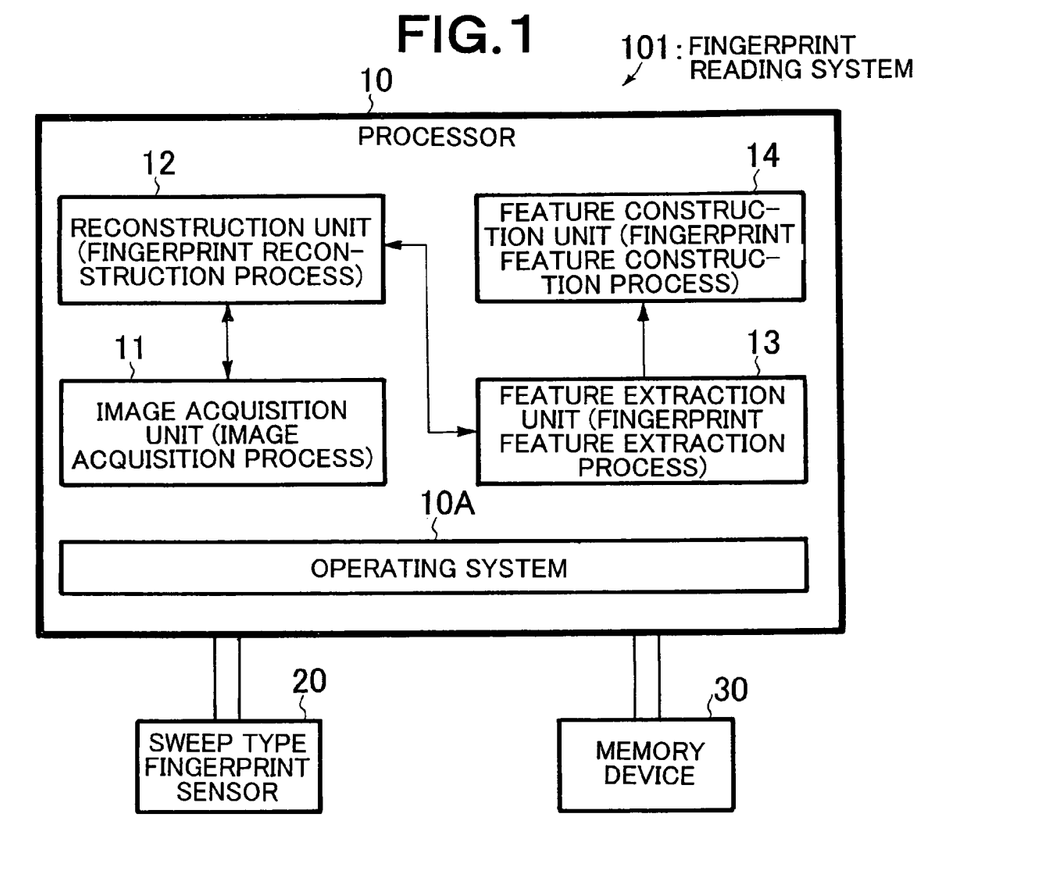
FIG. 1 is a block diagram of a fingerprint reading system according to an embodiment of the present invention.

Hereafter, embodiments of the present invention will be described in detail with reference to the drawings. FIG. 1 is a block diagram of a fingerprint reading system according to an embodiment of the present invention. A fingerprint reading system 101 in the embodiment is installed in a portable information communication terminal to fulfill the function of generating fingerprint feature information and conducting personal authentication on the user. As its main hardware configuration, the fingerprint reading system 101 includes a processor 10 on which an operating system 10A having a multi-task function of conducting parallel processing in a plurality of processes is mounted, a conventionally known sweep type fingerprint sensor 20, and a memory device 30 including a RAM which stores image data of a fingerprint read by the sensor 20 and a ROM which stores programs to respectively execute processes described later, as shown in FIG. 1.

Figure 2:
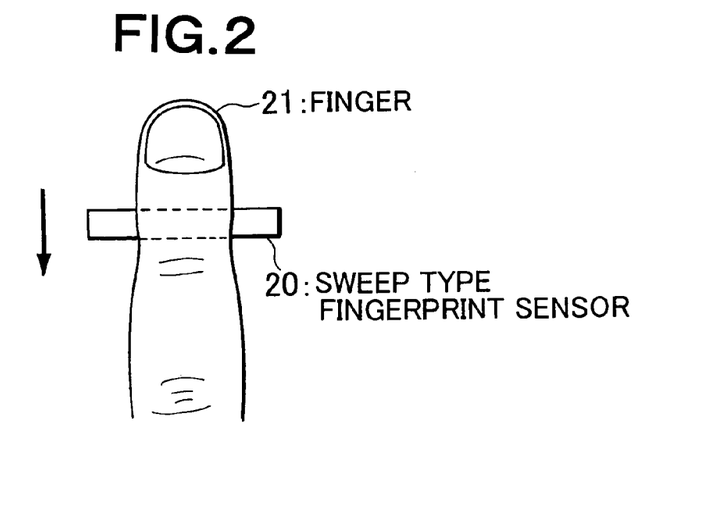
FIG. 2 is a diagram showing a sweep type fingerprint sensor according to an embodiment.

FIG. 2 shows an exterior view of the sweep type fingerprint sensor 20 in the present embodiment. The sweep type fingerprint sensor 20 has a rectangular perception plane which has a lateral width equivalent to the width of a finger 21. While the finger 21 is conducting sliding operation on the plane in its longitudinal width direction, the sweep type fingerprint sensor 20 successively reads a series of partial fingerprint images on the basis of control of the processor 10. The sweep type fingerprint sensor 20, the processor 10, and connection means between them should have high performance enough to read the fingerprint in a time interval sufficiently shorter than a travel speed of the finger 21.

As shown in FIG. 1, the processor 10 includes an image acquisition unit 11, a reconstruction unit 12, a feature extraction unit 13, and a feature construction unit 14. The image acquisition unit 11 executes an image acquisition process to successively acquire partial fingerprint images by using the sweep type fingerprint sensor 20. The reconstruction unit 12 executes a fingerprint reconstruction process to make a partial fingerprint image acquired by the image acquisition unit 11 and an already acquired partial fingerprint image overlap each other in a corresponding portion, store a resultant image in the memory device 30, and monitor to determine whether a definite region which becomes a region in which a new image change is not caused by the storage has reached a predetermined size. Upon detecting by using the reconstruction unit 12 that the definite region has reached the predetermined size, the feature extraction unit 13 generates feature information of the fingerprint by using an image in the definite region. After the generation, the feature extraction unit 13 executes a fingerprint feature extraction process to release a memory portion of the definite region. The feature construction unit 14 executes a feature construction process to successively record feature information generated by the feature extraction unit 13 in accordance with its generation order. When the feature extraction unit 13 has released the definite region, the reconstruction unit 12 conducts reconstruction processing on subsequent partial fingerprint images by using the memory portion.

An operation procedure of the fingerprint reading system 101 will now be described by using a concrete example with reference to a flow chart shown in FIG. 3. It is now supposed that memory regions shown in FIG. 4 are assigned to the memory device 30. The memory regions are a primary region 310 in which partial fingerprint images acquired by the image acquisition unit 11 by using the sweep type fingerprint sensor 20 are stored, a reconstruction region 311 in which partial fingerprint images to be subjected to reconstruction are disposed, and a fingerprint feature information storage region 312 in which finally obtained feature information of the fingerprint is disposed. A partial feature extraction region 61 is provided in the reconstruction region 311 described later to determine the size of the definite region.

Figure 5:
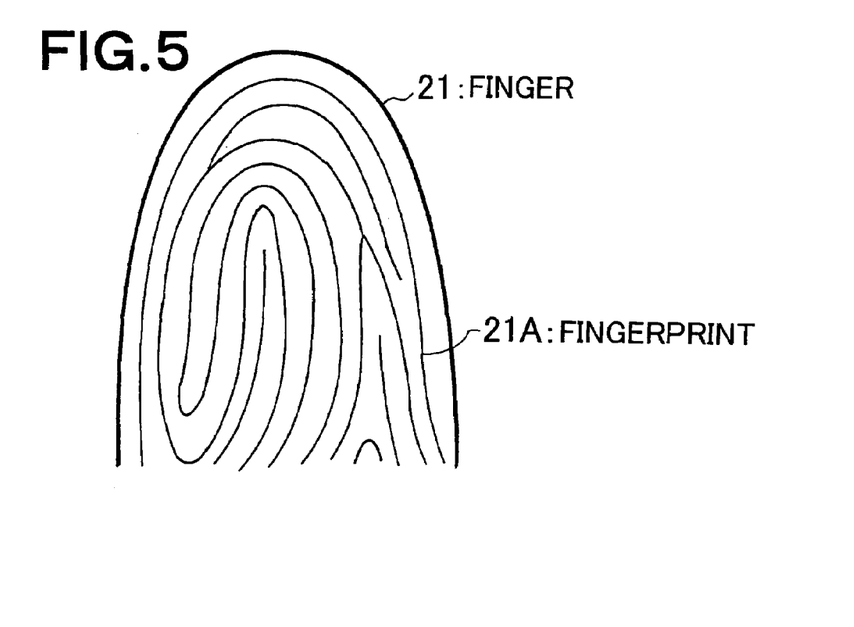
FIG. 5 is a diagram showing a fingerprint handled according to an embodiment.
Figure 6:
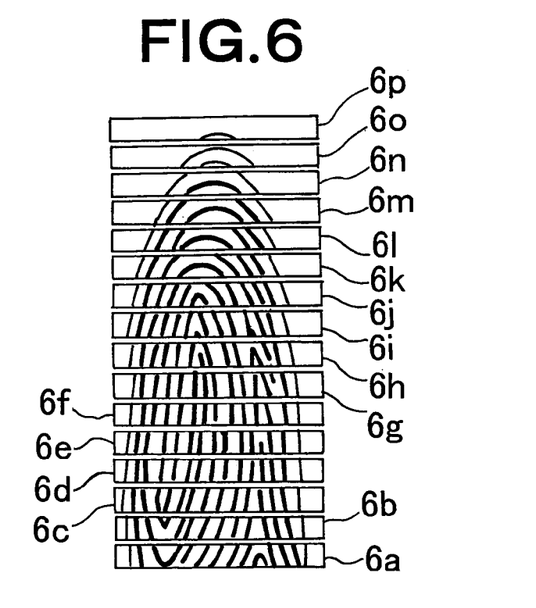
FIG. 6 is a diagram showing an image acquisition process according to an embodiment.

First, when the user slides a finger on the sweep type fingerprint sensor 20, the image acquisition unit 11 acquires partial images of a fingerprint from the sweep type fingerprint sensor 20 (step S1). Supposing that a fingerprint 21A of the user has a shape shown in FIG. 5, the image acquisition unit 11 successively acquires strip-shaped partial fingerprint images as shown in FIG. 6 in the order of partial fingerprint images 6a, 6b, 6c, . . . , 6p. Upon acquiring one partial fingerprint image, the image acquisition unit 11 places it on the primary region 310 on the memory device 30 (step S2), and notifies the effect to the reconstruction unit 12 (step S3).

The primary region 310 is a region corresponding to one image obtained from the sweep type fingerprint sensor 20. Until the image acquisition unit 11 receives a partial fingerprint image delivery request from the reconstruction unit 12, the image acquisition unit 11 holds the image in the primary region 310 and waits (step S4). The image acquisition unit 11 delivers the partial fingerprint image in response to a request issued by the reconstruction unit 12, and then passes into a procedure of acquiring a subsequent partial fingerprint image (step S5).

Figure 7:
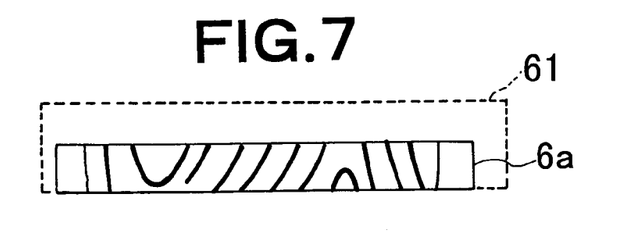
FIG. 7 is a diagram showing a fingerprint reconstruction process according to an embodiment.

On the other hand, the reconstruction unit 12 waits for placing the partial fingerprint image on the primary region 310 (step S6). Upon receiving the notice issued by the image acquisition unit 11 at the step S3, the reconstruction unit 12 passes into a procedure of reconstruction processing of disposing the partial fingerprint image stored on the primary region 310 into the reconstruction region 311 (step S7). If the partial fingerprint image delivered from the primary region 310 is the first partial fingerprint image 6a, the image is disposed on the bottom portion of the reconstruction region 311 as shown in FIG. 7. Subsequently, when disposing the subsequent partial fingerprint image 6b, the reconstruction unit 12 compares the partial fingerprint image 6b with the partial fingerprint image 6a already disposed, and disposes them so as to overlap places where the degree of coincidence between them is the highest. The state is shown in FIG. 8.

Whenever the reconstruction unit 12 disposes a partial fingerprint image in the reconstruction region 311 according to the above-described procedure, the reconstruction unit 12 notifies the image acquisition unit 11 that the use of the primary region 310 has finished (step S8). The image acquisition unit 11 acquires a new partial fingerprint image from the sweep type fingerprint sensor 20 in response to the notice.

The reconstruction unit 12 disposes subsequent partial fingerprint images successively in the reconstruction region 311 in accordance with the above-described procedure, and monitors during that time to determine whether the size of the definite region has reached a predetermined size (step S9). The definite region means a region in the reconstruction region 311 in which a change is not caused in the image even if a partial fingerprint image is newly added. In the present embodiment, the predetermined size of the definite region corresponds to the size in the partial feature extraction region 61. A partial fingerprint image group stored in the reconstruction region 311 and reconstructed gradually becomes large as the finger 21 moves, and accordingly the size of the definite region is also expanded.

Figure 8:
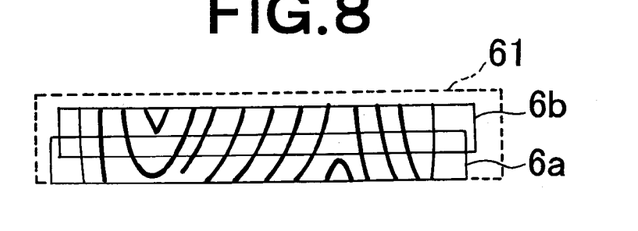
FIG. 8 is a diagram showing a fingerprint reconstruction process according to an embodiment.
Figure 9:
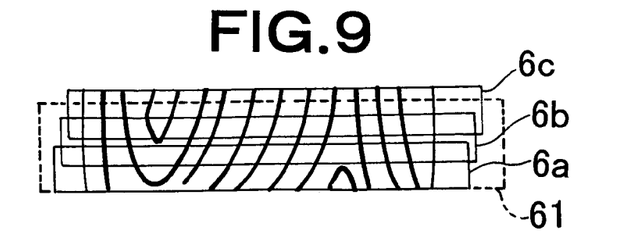
FIG. 9 is a diagram showing a fingerprint reconstruction process according to an embodiment.

Specifically, for example, in a state in which the partial fingerprint images 6a and 6b are disposed as shown in FIG. 8, a partial fingerprint image 6c is newly disposed as shown in FIG. 9. Since the partial fingerprint image 6c has been added, the image in the partial feature extraction region 61 changes at this time. At this time, therefore, the reconstruction unit 12 judges that the definite region has not yet reached the predetermined size.

Figure 10:
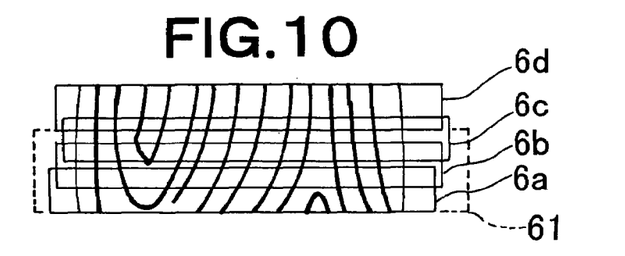
FIG. 10 is a diagram showing a fingerprint reconstruction process according to an embodiment.

If a partial fingerprint image 6d is newly disposed, a state shown in FIG. 10 is brought about. Since a storage place of the added partial fingerprint image 6d gets out of the partial feature extraction region 61 at this time, the image in the partial feature extraction region 61 does not change. At this time, the reconstruction unit 12 judges that the definite region has reached the predetermined size.

By the way, if an overlapping portion of the newly disposed partial fingerprint image 6d and the partial fingerprint image 6c is included in the partial feature extraction region 61, the image in the partial feature extraction region 61 changes little. In this case as well, therefore, the definite region may be judged to have reached the predetermined size. In order to simplify the decision criterion, however, it is desirable to use the method described with reference to FIG. 10, i.e., to determine whether the disposition place of the new partial fingerprint image gets out of the partial feature extraction region 61 as the criterion for the decision at the step S9.

When the definite region is judged to have reached the predetermined size, the reconstruction unit 12 gives a notice to the feature extraction unit 13 so as to extract feature information of the fingerprint from the image in the partial feature extraction region 61 corresponding to the predetermined size (step S10).

Figure 11:
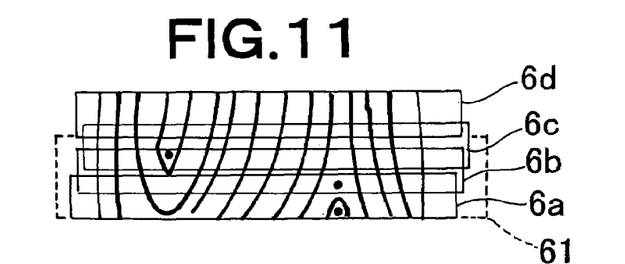
FIG. 11 is a diagram showing a fingerprint feature extraction process according to an embodiment.

The feature extraction unit 13 waits for the above-described notice from the reconstruction unit 12 (step S11). Upon receiving the notice, the feature extraction unit 13 conducts processing of extracting feature information of the fingerprint from the image in the partial feature extraction region 61 (step S12). The fingerprint feature extraction processing is conventionally known image processing using frequency analysis means such as fast Fourier transform processing. Owing to this processing, a feature such as location of a branch point or an end point of an upheaval line is extracted from the subject fingerprint image. The feature information of the fingerprint is used in subsequent fingerprint collation processing. FIG. 11 shows a state in which the feature of the fingerprint has been extracted. The feature extraction unit 13 delivers the fingerprint feature information generated by the feature information extraction processing to the feature construction unit 14 (step S13).

Figure 12:
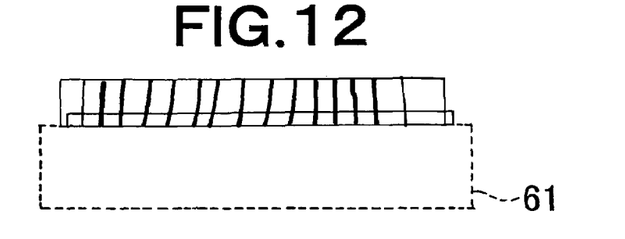
FIG. 12 is a diagram showing a fingerprint feature extraction process according to an embodiment.

As shown in FIG. 12, the feature extraction unit 13 releases the partial feature extraction region 61 where feature extraction processing is finished so as to make the partial feature extraction region 61 available to the reconstruction unit 12 in reconstruction processing, and notifies the effect to the reconstruction unit 12 (step S14). As a result, the reconstruction unit 12 can apply the released partial feature extraction region 61 in the reconstruction region 311 to new reconstruction processing.

The feature construction unit 14 waits for supply of feature information conducted by the feature extraction unit 13 (step S15). Upon being supplied with feature information, the feature information is stored in the fingerprint feature information storage region 312 of the memory device 30 (step S16).

Figure 13:
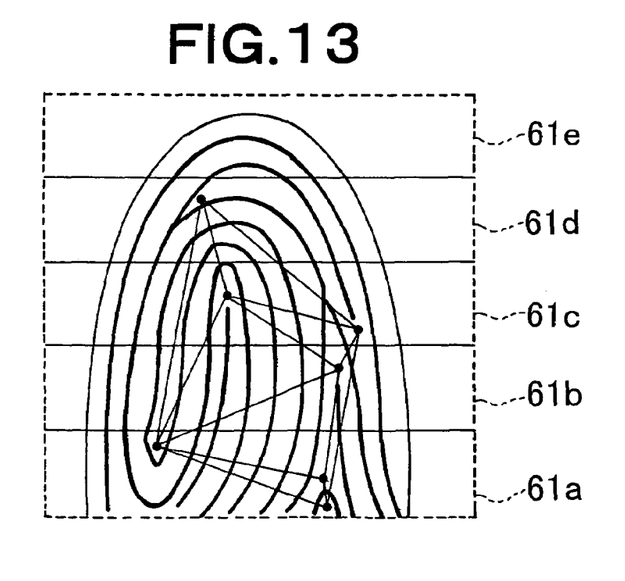
FIG. 13 is a diagram showing a fingerprint feature construction process according to an embodiment.

The above-described procedure is repeated, and the feature construction unit 14 successively stores feature information obtained from the feature extraction unit 13. As a result, feature information pieces 61a to 61e of the whole fingerprint as shown in FIG. 13 is recorded in the fingerprint feature information storage region 312. As illustrated, the feature information pieces have no mutually overlapping portions and mutual positional relations are clear. Therefore, the feature construction unit 14 can easily construct the feature information of the whole fingerprint. By the way, in the authentication processing, collation may be conducted successively without waiting until the all feature information pieces 61a to 61e of the whole fingerprint are collected in the fingerprint feature information storage region 312.

According to fingerprint reading system 101 in the embodiment heretofore described, the partial feature extraction region 61 is released whenever the feature extraction unit 13 extracts feature information of the fingerprint. Therefore, the reconstruction region 311 of the memory device 30 can be used efficiently. Therefore, the reconstruction processing of the partial fingerprint images can be conducted without preparing a vast reconstruction region 311 in the memory device 30. Furthermore, since the feature extraction processing is started without waiting for the reconstruction of the partial fingerprint images for the whole fingerprint, the processing time of the processes leading to the fingerprint collation processing can be shortened.

Figure 3:
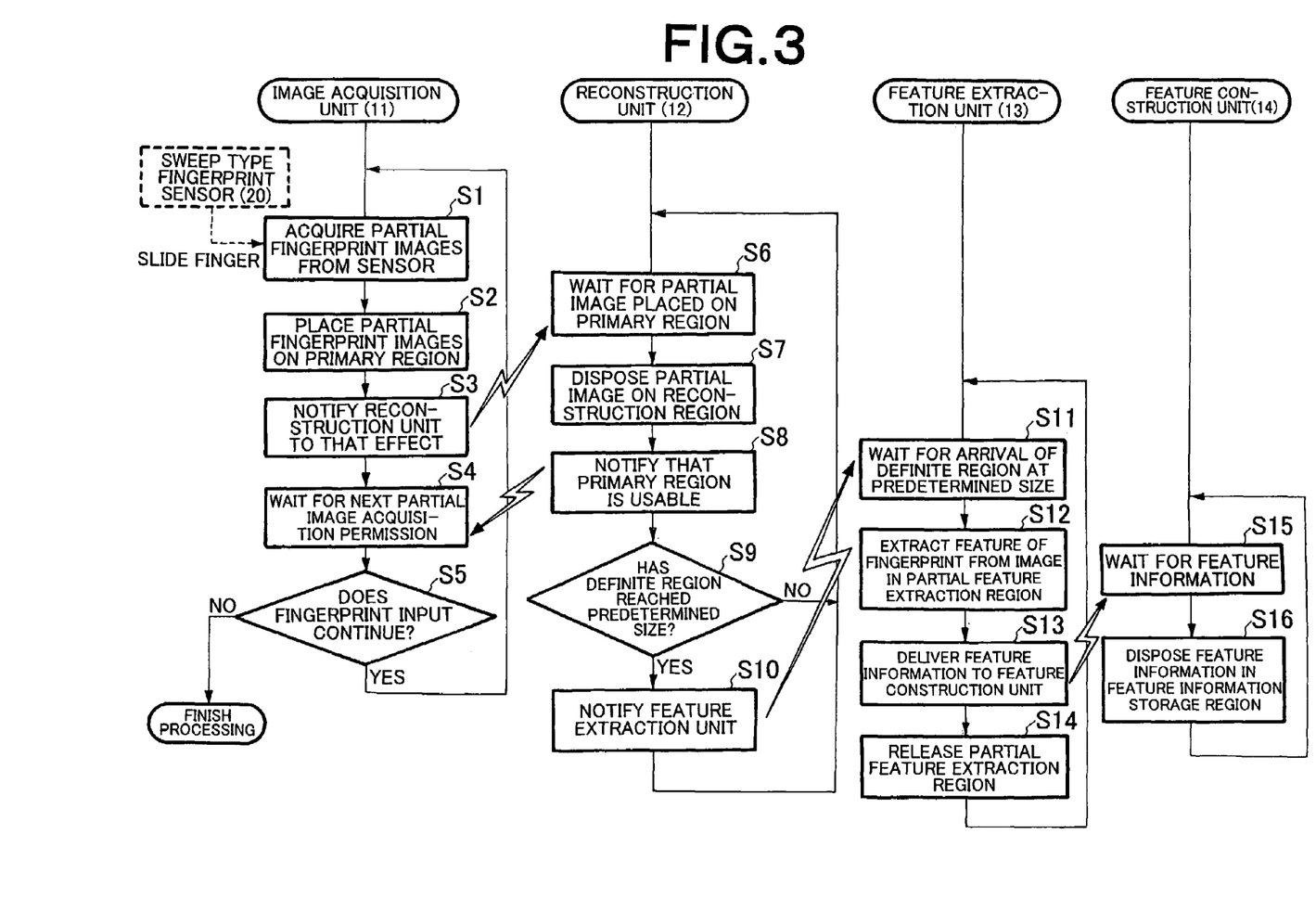
FIG. 3 is a flow chart showing an operation procedure according to an embodiment.
Figure 4:
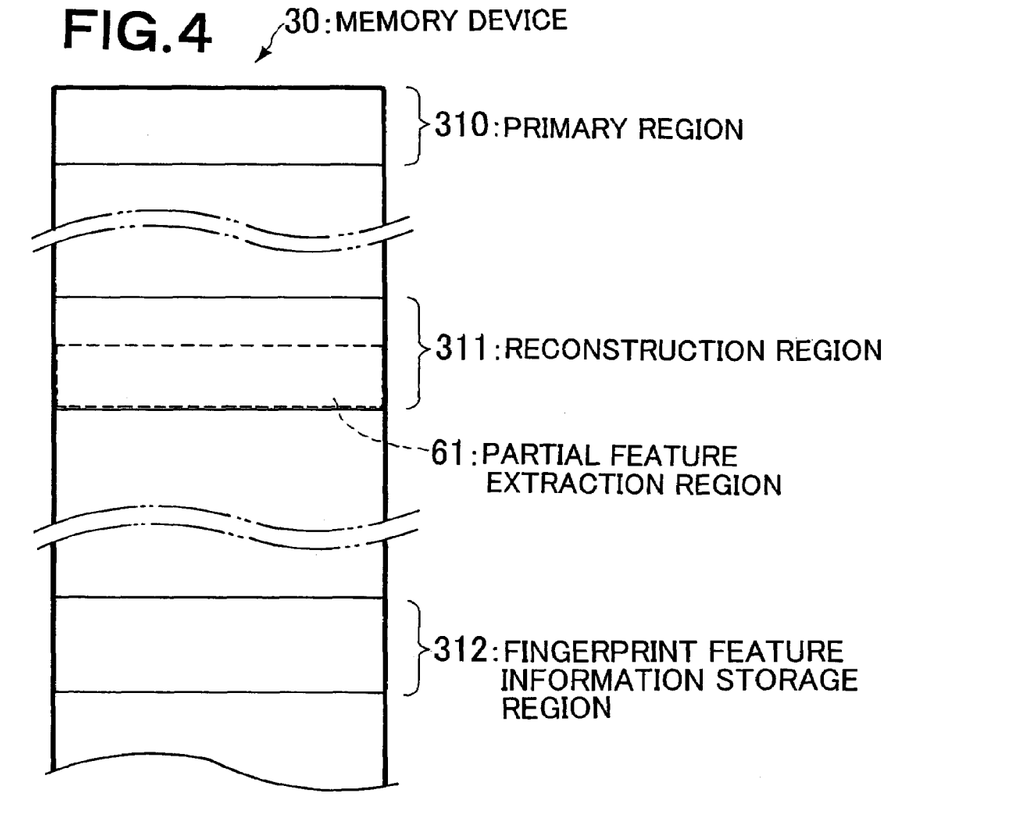
FIG. 4 is a diagram showing a memory region of a memory device according to an embodiment.

In the above-described embodiment, whether a partial fingerprint image to be newly disposed is included in the partial feature extraction region 61 is used as the decision criterion in monitoring the definite region (step S9 shown in FIG. 3). Alternatively, for example, it is also possible to preset a presumed time when the partial feature extraction region 61 can be formed and pass into the fingerprint feature extraction process periodically at that time intervals. As a result, the decision procedure can be simplified.

As for a method of releasing the partial feature extraction region 61 conducted by the feature extraction unit 13 (step S14 shown in FIG. 13) besides deletion of data in the memory region, the release of the partial feature extraction region 61 can be implemented by, for example, previously providing the reconstruction region 311 with a ring buffer structure and overwriting the memory region already finished in feature extraction processing with a new partial fingerprint image.

(Another Embodiment)

Figure 14:
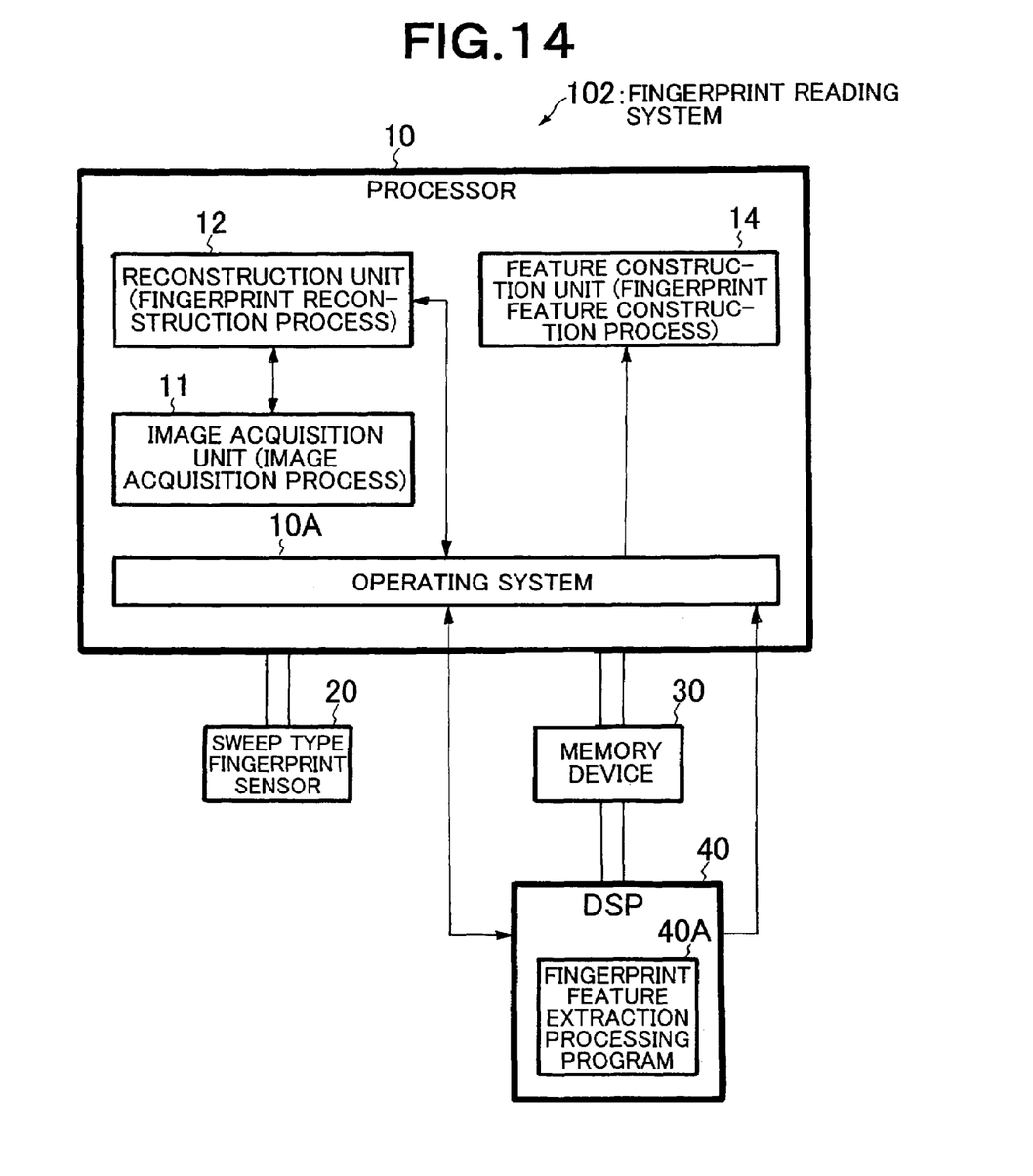
FIG. 14 is a block diagram of a fingerprint reading system according to another embodiment of the present invention.

FIG. 14 is a block diagram showing a configuration of another embodiment according to the present invention. A fingerprint reading system 102 in the present embodiment differs from the fingerprint reading system 101 shown in FIG. 1 in that a DSP (Digital Signal Processor) 40 which shares the memory device 30 with the processor 10 serving as the main processor is installed and the DSP 40 executes a fingerprint feature extraction processing program 40A corresponding to the fingerprint feature extraction process described above. The DSP 40 is a conventionally known processor installed to execute specific arithmetic operation processing faster than the CPU serving as the main processor. In the present embodiment, the DSP 40 fulfills the function of the feature extraction unit in the fingerprint reading system according to the present invention.

An operation procedure of the fingerprint reading system 102 will now be described while laying stress on differences from the fingerprint reading system 101. The reconstruction system 12 successively reconstructs partial fingerprint images acquired from the sweep type fingerprint sensor 20 by the image acquisition unit 11, and monitors over that time to determine whether the definite region has reached the predetermined size (step S9 in FIG. 3). If the definite region reaches the predetermined size, the reconstruction unit 12 notifies the DSP 40 to that effect under the control of the operating system 10A. Upon receiving this notice, the DSP 40 executes a fingerprint feature extraction processing program 40A.

The DSP 40 executing the fingerprint feature extraction processing program 40A generates feature information of the fingerprint by using the image in the partial feature extraction region 61 in the reconstruction region 311 of the memory device 30, delivers the feature information to the feature construction unit 14, and releases the partial feature extraction region 61 for reconstruction processing in the reconstruction unit 12. By repeating the procedure heretofore described, feature information of the whole fingerprint similar to that described with reference to FIG. 13 is recorded in the fingerprint feature information storage region 312 in the memory device 30.

According to the fingerprint reading system 102 heretofore described, the processing of extracting the fingerprint feature is conducted by the DSP 40, and consequently the speed of the fingerprint feature extraction process can be increased.

The fingerprint reading system and the fingerprint reading method according to the present invention can be applied, in general, to various devices, such as electronic devices called information terminals or information devices, personal computers and their peripheral devices, portable telephones, or personal digital assistants like schedule terminal devices.

What is claimed is:

1. A fingerprint reading method conducted by using a fingerprint reading system including a sweep type fingerprint sensor to read a series of partial fingerprint images representing a fingerprint from a finger which conducts slide operation, the fingerprint reading method comprising:

an image acquisition process to successively acquire a partial fingerprint image by using the sweep type fingerprint sensor;

a reconstruction process to make a partial fingerprint image acquired by said image acquisition process and an already acquired partial fingerprint image overlap each other in a corresponding portion, store a resultant image in a memory, and monitor to determine whether a definite region which becomes a region in which no new image change is caused by the storage has reached a predetermined size;

a feature extraction process to generate feature information of the fingerprint by using an image in the definite region when the definite region has reached the predetermined size in said reconstruction process, and to release a memory portion corresponding to the definite region after the generation of feature information; and a feature construction process to successively record feature information generated in said feature extraction process in accordance with its generation order, and executing said reconstruction process on a subsequent partial fingerprint image by using a memory portion corresponding to the definite region, when the memory portion is released in said feature extraction process.

2. The fingerprint reading method according to claim 1, wherein in said reconstruction process, the fingerprint reading system judges that the definite region has reached the predetermined size when a storage place of a partial fingerprint image to be newly added to the memory gets out of a memory region forming the predetermined size.

3. The fingerprint reading method according to claim 1, wherein when a partial fingerprint image acquired in said image acquisition process is stored in the memory in said reconstruction process, the fingerprint reading system executes a new image acquisition process.

4. A fingerprint reading system including a sweep type fingerprint sensor to read a series of partial fingerprint images representing a fingerprint from a finger which conducts slide operation, and a memory to store a partial fingerprint image read by the sensor, the fingerprint reading system comprising:

an image acquisition unit which successively acquires partial fingerprint images by using the sweep type fingerprint sensor;

a reconstruction unit which makes a partial fingerprint image acquired by said image acquisition unit and an already acquired partial fingerprint image overlap each other in a corresponding portion, stores a resultant image in the memory, and monitors to determine whether a definite region which becomes a region in which no new image change is caused by the storage has reached a predetermined size;

a feature extraction unit which generates feature information of the fingerprint by using an image in the definite region when the definite region has reached the predetermined size in said reconstruction unit, and releases a memory portion corresponding to the definite region after the generation of feature information; and a feature construction unit which successively records feature information generated by said feature extraction unit in accordance with its generation order, wherein when said feature extraction unit has released the memory portion corresponding to the definite region, said reconstruction unit stores a subsequent partial fingerprint image in the memory portion.

5. The fingerprint reading system according to claim 4, wherein said reconstruction unit judges that the definite region has reached the predetermined size when a storage place of a partial fingerprint image to be newly added to the memory gets out of a memory region forming the predetermined size.

6. The fingerprint reading system according to claim 4, wherein when an acquired partial fingerprint image is stored in the memory, said image acquisition unit acquires a new partial fingerprint image.

7. The fingerprint reading system according to claim 4, comprising at least a first processor which executes arithmetic operation processing concerning said image acquisition unit, and a second processor which is capable of conducting arithmetic operation processing faster than that in said first processor and which executes arithmetic operation processing concerning said feature extraction unit.

8. A computer readable medium having computer instructions for enabling a computer executing the computer instructions to perform a fingerprint reading method, said fingerprint being read by a sweep type fingerprint sensor reading a series of partial fingerprint images representing a fingerprint, said method comprising:

an image acquisition process to successively acquire a partial fingerprint image by using the sweep type fingerprint sensor;

a reconstruction process to make a partial fingerprint image acquired by said image acquisition process and an already acquired partial fingerprint image overlap each other in a corresponding portion, store a resultant image in a memory, and monitor to determine whether a definite region which becomes a region in which no new image change is caused by the storage has reached a predetermined size;

a feature extraction process to generate feature information of the fingerprint by using an image in the definite region when the definite region has reached the predetermined size in said reconstruction process, and to release a memory portion corresponding to the definite region after the generation of feature information; and a feature construction process to successively record feature information generated in said feature extraction process in accordance with its generation order, and executing said reconstruction process on a subsequent partial fingerprint image by using a memory portion corresponding to the definite region, when the memory portion is released in said feature extraction process.

* * * * *